(12) United States Patent
Kim (10) Patent No.: US 11,847,297 B2
(45) Date of Patent: Dec. 19, 2023

(54) METHOD OF PROVIDING REAL-TIME VR SERVICE THROUGH AVATAR

(71) Applicant: MECLOUDS Inc., Incheon (KR)

(72) Inventor: Sung Ryong Kim, Seoul (KR)

(73) Assignee: MECLOUDS INC., Incheon (KR)

(*) Notice: Subject to any disclaimer, the term of this patent is extended or adjusted under 35 U.S.C. 154(b) by 125 days.

(21) Appl. No.: 17/626,028

(22) PCT Filed: Jul. 9, 2020

(86) PCT No.: PCT/KR2020/008978
§ 371 (c)(1),
(2) Date: Jan. 10, 2022

(87) PCT Pub. No.: WO2021/006648
PCT Pub. Date: Jan. 14, 2021

(65) Prior Publication Data
US 2022/0253197 A1 Aug. 11, 2022

(30) Foreign Application Priority Data

Jul. 10, 2019 (KR) .......... 10-2019-0083097
Jul. 10, 2019 (KR) .......... 10-2019-0083098

(51) Int. Cl.
*G06F 3/04815* (2022.01)
*G06F 16/583* (2019.01)
*G06F 3/01* (2006.01)

(52) U.S. Cl.
CPC .......... *G06F 3/04815* (2013.01); *G06F 3/011* (2013.01); *G06F 16/5854* (2019.01)

(58) Field of Classification Search
CPC .................................................. G06F 3/04815
(Continued)

(56) References Cited

U.S. PATENT DOCUMENTS

2014/0164129 A1* 6/2014 Joshi ................. G06Q 30/0261
705/14.58
2019/0147619 A1* 5/2019 Goldman ............... G01B 11/03
382/154
(Continued)

FOREIGN PATENT DOCUMENTS

JP 2004-054877 A 2/2004
KR 10-2003-0086326 A 11/2003
(Continued)

*Primary Examiner* — Ruay Ho
(74) *Attorney, Agent, or Firm* — NKL Law; Jae Youn Kim (57) ABSTRACT

Disclosed is a real time virtual reality (VR) service provision method including registering a client profile in an application management server by a client device, the client profile including information on a VR image that the client device wants to request, by the client device, registering avatar profiles in the application management server by a plurality of avatar devices, the avatar profiles including information on a VR image to be requested by the avatar device, comparing the client profile and the avatar profiles with each other to search for an avatar profile, at least one piece of information of which is matched with the client profile, and providing a first searching result to the client device, by the application management server, receiving input of the client device, for selecting a specific avatar device in the first search result, by the application management server, matching the client device and the specific client device with each other by the application management server, and receiving a VR image from the matched avatar device by the client device.

8 Claims, 6 Drawing Sheets

(58) Field of Classification Search
USPC .................. 715/757; 705/14.58; 382/154
See application file for complete search history.

(56) References Cited

U.S. PATENT DOCUMENTS

| | | | |
|---|---|---|---|
| 2019/0228448 A1* | 7/2019 | Bleicher | ............ G06Q 30/0631 |
| 2020/0312029 A1* | 10/2020 | Heinen | .................. G06T 17/20 |
| 2020/0334908 A1* | 10/2020 | Wilson | ................. G06T 19/006 |

FOREIGN PATENT DOCUMENTS

| | | |
|---|---|---|
| KR | 10-2013-0082718 A | 7/2013 |
| KR | 10-1343860 B1 | 12/2013 |
| KR | 10-1990428 B1 | 6/2019 |

* cited by examiner

METHOD OF PROVIDING REAL-TIME VR SERVICE THROUGH AVATAR

TECHNICAL FIELD

The present invention relates to a method and an apparatus therefor, and a method and a system for matching a virtual reality (VR) image wanted by a client with an avatar device to be transmitted in real time and receiving the VR image in real time through the matched avatar device.

BACKGROUND ART

Recently, each carrier has launched various functions and services utilizing 5th generation (5G). As a result, it become possible to connect big data, which could not be achieved due to limitation of communication speed, making it possible to broadcast without delay anywhere in the world, as well as remote control. Moreover, there is a trend to introduce next-generation communication technologies in a global race and an attempt to transcend time and space with new technologies such as virtual remote video conferencing, Telepresence, have continued.

Therefore, the industry predicts that domestic 5G communication and 360-degree VR services can grow tens of times over the next 10 years, and life-based platform services and travel services are currently in a stabilization stage, and demand and sales thereof are rapidly increasing every year. Recently, local governments and government offices as well as general companies have tried to discover new business projects linked with new services using VR.

DETAILED DESCRIPTION OF THE INVENTION

Technical Problem

Therefore, the present invention provides a service device, method, and system for receiving or providing a virtual reality (VR) image wanted by a client in real time based on faster communication speed.

Technical Solution

To achieve the technical problem, the present invention provides a real time virtual reality (VR) service provision method including registering a client profile in an application management server by a client device, the client profile including information on a VR image that the client device wants to request, by the client device, registering avatar profiles in the application management server by a plurality of avatar devices, the avatar profiles including information on a VR image to be requested by the avatar device, comparing the client profile and the avatar profiles with each other to search for an avatar profile, at least one piece of information of which is matched with the client profile, and providing a first searching result to the client device, by the application management server, receiving input of the client device, for selecting a specific avatar device in the first search result, by the application management server, matching the client device and the specific client device with each other by the application management server, and receiving a VR image from the matched avatar device by the client device.

According to one feature of the present invention, as the information on the VR image, the client profile may include information on a shooting location, a shooting time, a language used, and/or a shooting request cost of a VR image the client device wants to request, and the avatar profile includes information on a shooting location, a shooting time, a language used, and/or a shooting request cost of a VR image to be requested.

According to another feature of the present invention, the receiving the VR image from the matched avatar device by the client device may include receiving a VR image captured at a shooting time and a shooting location, which are registered in the client profile, from the matched avatar device by the client device.

According to another feature of the present invention, the providing the first searching result to the client device may include when the first searching result includes a plurality of avatar devices, ranking an avatar device with a higher matching degree of profile information with the client device at a higher level among the plurality of avatar devices and providing the avatar device to the client, by the application management server.

According to another feature of the present invention, the receiving the VR image may further include providing a real time voice chat or text chat function between the client device and the matched avatar device by the application management server, and wherein the providing the real time voice chat or text chat function may include when a used language registered in the client profile by the client device and a used language registered in the avatar profile by the matched avatar device are different from each other, performing automatic translation according to a language used by each device and providing the real time voice chat or text chat function by the application management server.

According to another feature of the present invention, the real time VR service provision method may further include searching for a shooting location of a VR image that the client device currently wants to request; and providing a second searching result obtained by searching for an avatar device positioned at the shooting location to the client device, wherein the second searching result includes information on at least one avatar device positioned within a preset distance from the shooting location, information on a current location of the at least one avatar device, and/or information on an avatar profile of the at least one avatar device.

According to another feature of the present invention, the real time VR service provision method may further include when the second searching result includes a plurality of avatar devices, receiving selection input for selecting a specific avatar device among the plurality of avatar devices from the client device and matching the selected specific avatar device and the client device, by the application management server; and receiving a VR image from a VR image from the matched avatar device by the client device.

According to another feature of the present invention, the real time VR service provision method may further include when the matched avatar device is a robot avatar device, transmitting a first control signal for controlling a moving direction, angle, and/or speed of the matched avatar device to the matched avatar device, by the client device; and moving the matched avatar device according to the first control signal, wherein the first control signal is generated in synchronization with a moving input signal of a user with respect to the client device.

According to another feature of the present invention, when the client device is paired with another device controlled to be moved by a user, the first control signal is generated in synchronization with a moving control signal received by the client device from the other device, and moving of the matched avatar device is synchronized with moving of the other device.

According to another feature of the present invention, when a maximum shooting angle of a camera unit included in the matched avatar device for capturing the VR image is less than 360 degrees, a shooting direction of the camera unit is synchronized with a user head wearing the client device or a gaze direction, wherein a shooting angle of the camera unit is controlled according to a second control signal transmitted from the client device, and wherein the second signal is generated in synchronization with a sensing result of the user head wearing the client device or the gaze direction.

Effect of the Invention

When a real-time VR service providing method of the present invention is used, a client may indirectly experience various environments such as scenery, objects, and exhibits in a specific area (especially, far away) that the client wants to experience through a virtual reality (VR) image in a more realistic way even if the client does not go directly.

When a real-time VR service providing method of the present invention is used, it may be possible to communicate with an avatar in real time, and thus a client may more actively and flexibly experience desired experience through the avatar.

When a real-time VR service providing method of the present invention is used, it may be possible to derive a new VR services that did not exist before, such as VR travel/experience, and thus there may be an economic effect such as creation of new jobs.

When a real-time VR service providing method of the present invention is used, the client may directly manipulate moving/motion of a robot avatar, and thus the client may more actively and flexibly experience a desired experience through the robot avatar.

In addition to the effects of the present invention as described above, other effects may be further mentioned in the following description.

BEST EMBODIMENT OF THE INVENTION

Hereinafter, embodiments of the present invention will be described in detail with reference to the accompanying drawings. However, the embodiments described below are merely for explaining in detail enough that one of ordinary skill in the art to which the present invention pertains can easily practice the invention, which does not mean that the protection scope of the present invention is limited.

In performing a method or an operating method, processes of the method may occur differently from a specified order unless a specific order is clearly described in context. That is, the processes may occur in the same order as specified, may be performed substantially simultaneously, or may be performed in a reverse order.

The specification basically proposes a real avatar/companion/advice service (REAL AVATAR/ACCOMPANY/ADVICE SERVICE (RAS)) system. The RAS refers to a service in which an avatar performs/experiences things the client wants to experience on behalf of a client and accompanies others. This service aims to be a platform in which various people communicate with each other, and thus various pieces of image information are capable of being shared and communicated through the service.

According to the present invention, when a client requests an experience (for example, traveling to a remote destination, visiting an exhibition, attending an overseas concert, and attending a class) desired by the client using real time VR using a high-speed communication service such as 5G and a location-based service, the avatar experiences it on behalf of the client, and an experience situation may be broadcast and transmitted in real time as a VR image.

This is also called a technology field called Teleexistence, and combined with VR devices and high-speed mobile communication to create a new service product. Through the service product created in this way, the client may be capable of feeling a sense of presence as if a remote object or person is nearby and may be capable of directly establishing an experience environment through real time communication/communication with an avatar.

There may be cases in which a user wants to experience a situation himself or herself but it may not be possible due to time/space/realistic limitations, and an example thereof may include a child who is fighting a disease but wishes to climb Kilimanjaro, a child who is in Vietnam but wants to go to a concert of a specific singer in Korea, a 90-year-old grandfather who wants to see his hometown in North Korea before he dies, a housewife who wants to see and purchase a product at a discount shopping event held at Times Square in Yeongdeungpo but does not have time to visit due to childcare, or a father who is on a business trip but wants to attend his daughter's celebration.

A client with such limitations may directly request a situation the client wants to experience directly through the present service system, and the service system may match an avatar to perform the corresponding request with the client. The matched avatar may satisfy the client by performing a task requested by the client, and the client may pay a predetermined fee to the avatar for this.

An implementation method and various embodiments of a service system will be described in detail below with reference to drawings below.

Figure 1:
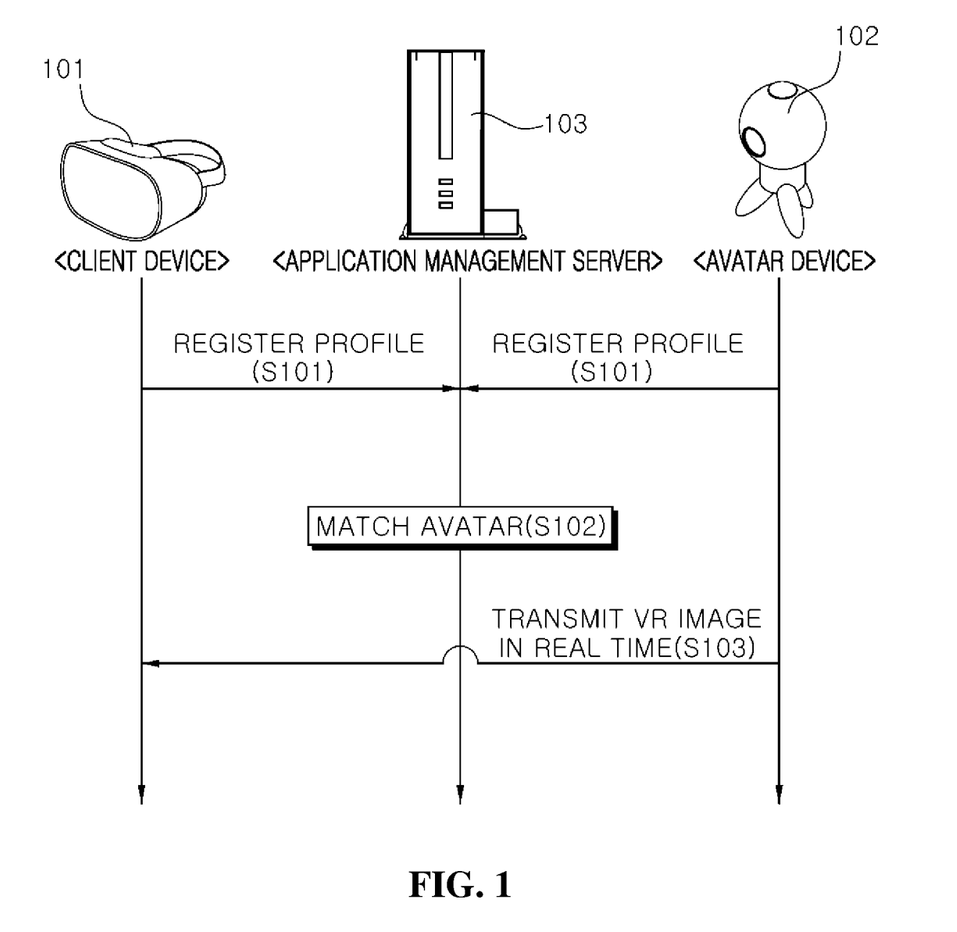
FIG. 1 is a flowchart showing an example of a real time VR service method through a real avatar according to an embodiment of the present invention.

FIG. 1 is a brief flowchart showing a real time VR service method through a real avatar according to an embodiment of the present invention. In the flowchart, the order of each operation may be changed, and at least one operation may be newly added or deleted. In addition, in the flowchart, a client device refers to a device of a client who requests a VR image, and an avatar device refers to a device of an avatar that provides/transmits the requested VR image to the client device in real time. The real time VR service in the specification may be implemented through a specific application, and the client device and the avatar device in the specification may correspond to an electronic device installed with such a specific application/program (hereinafter, collectively referred to as an application).

Referring to FIG. 1, first, a client device 101 and/or an avatar device 102 may register a profile (S101). Here, the profile may be basic information required for avatar matching/connection, and in the case of a client, the profile may include information on a content type of a VR image that the client wants to request, a shooting location, a shooting time, a shooting request cost, an interest, a thing to do, a wanted thing, a schedule, and/or a language used, and in the case of an avatar, the profile may include information on a content type of a VR image to be requested, a shooting location, a shooting time, a shooting request cost, an interest, a thing to do, a wanted thing, a schedule, and/or a language used. The profile may be registered in an application management server 103 for managing/operating a real time VR service. Whether the profile registered in this way is to be disclosed or not may be set, and when the profile is set to be disclosed, the profile may be disclosed to others through an application.

Then, matching between the client device 101 and the avatar device 102 may be performed based on the registered profiles (S102). For example, the application management server 103 may compare the profile (e.g., place/time/thing to do/wanted thing) registered by the client device 101 and the profile (e.g., place/time/thing to do/wanted thing) registered by the avatar device 102 with each other and may match/connect devices having a high matching degree with each other. (S103). In this case, a matching degree may be evaluated differently for each matching condition/category (that is, a priority is different for each matching condition/category). For example, when matching the client device and the avatar device, the application management server 103 may determine whether the wanted thing (or thing to do) of the client device profile and the thing to do (or wanted thing) of the avatar device profile are matched with each other and may evaluate that a matching degree is the highest when matching is achieved.

Here, the matching refers to pairing connection between devices. The pairing connection means both direct connection between two devices as well as indirect pairing connection through an application management server. In the case of direct pairing connection, the client device 101 and the avatar device 102 may communicate by directly exchanging a wireless/wired control signal with each other, and in the case of indirect pairing connection, the client device 101 and the avatar device 102 may transmit and receive a wireless/wired control signal through the application management server 103, and the application management server 103 may transmit a control signal as a middle device between two devices in the middle.

In this case, the application management server 103 may provide the plurality of the avatar devices 102 to the client device 101 as a matching/connection candidate group, and as the number of matching conditions of the avatar device 102 is increased (or as a matching degree of the avatar device 102 is increased), the avatar device 102 may be ranked at a higher level and may provide information including simple profile summary information to the client device 101. The client may select the avatar device 102 to be matched/connected from among the plurality of avatar devices 102 based on the provided profile summary information to complete/terminate matching/connection.

Lastly, the client device 101 and the avatar device 102 that are matched with each other in this way may be connected to each other at a promised experience time, and the client device 101 may receive a VR image requested in real time from the avatar device 102 (S103). To this end, the application management server 103 may provide a function of mutually negotiating the experience time to the both devices through an application and may also provide real time shooting/display/broadcasting functions of the VR image to the both devices through the corresponding application.

Although not shown in this flowchart, conversely in operation S103, in some embodiments, an image captured by the client device 101 may be transmitted to the matched avatar device 102. According to this embodiment, an accompanying service, such as an accompanying service with a visually impaired, and a woman safe accompaniment service on the way home, may be derived.

For example, a client as a visually impaired may register his or her profile through the client device 101, and in this case, may register "accompanying/travel" as the wanted thing of the profile. The application management server 103 may perform matching with a specific avatar device 102 based on the profile of the client device 101 (i.e., operations S101 to S102 are performed). The matched avatar device 102 may receive an image captured by the client device 101 in real time and may simultaneously receive a conversation/chat function with the client device 101 in real time. As such, an avatar may allow the client to feel like they are traveling/accompanying them. In particular, the avatar may inform the client about whether there is any danger/obstacle that threatens the client along a way/travel through a real time chat function while sharing a video taken from a client's point of view in real time, and may also provide various pieces of information on a travel destination to the client.

Similarly, for example, a female client returning home late may register her profile through the client device 101, and at this time, may register "returning late" as a thing to do (or a wanted thing) as a thing to do (or wanted thing) of the profile. The application management server 103 may perform matching with the specific avatar device 102 based on the profile of the client device 101 (i.e., operations S101 to S102 are performed). The matched avatar device 102 may receive an image captured by the client device 101 in real time and may simultaneously receive a real time conversation/chat function with the client device 101. As such, the avatar may feel the client coming home together. In particular, the avatar may inform the client about a risk/person that threatens the client on the way home through the real time chat function while sharing the video captured from a client's point of view in real time, and may also provide road/traffic information on the way home to the client.

In some embodiments, the client device 101 may receive a VR image requested thereby at a promised experience time from the paired/connected avatar device 102 in real time. In this case, the client device 101 may actively build an environment the client wants to experience by directly operating the avatar device 102. For example, the client device 101 may transmit a control signal to the avatar device 102 directly (or indirectly through a real time VR service system) to manipulate moving/motion/movement/flight direction/speed, camera angle, etc. of the avatar device 102 and the avatar device 102 may transmit a VR image in real time by controlling moving/motion/movement/flight according to a control signal received from the client device.

In order to establish the real time VR service system, the avatar device 102 may be pre-equipped/arranged/installed/located in various places (for example, tourist attractions, exhibitions, shopping malls, etc.) or a service point containing the avatar device 102 may be located near the corresponding place. An avatar device delivery hired to execute the service system may position the avatar device 102 at a promised place prior to a pre-promised time, and the client device 101 and the avatar device 102 may be paired/connected to each other from the promised time to initiate a real time VR image transport service. The avatar device delivery may not only deliver the avatar device but also accompany an experience of the avatar device (that is, the avatar device delivery may also serve as a robot companion. In this case, the companion may perform real time/two way conversation with the client through a real time communication function with the client device provided through the avatar device while accompanying the avatar device. As such, the companion may serve as a guide or conversation partner for the client, such as providing various advices/information about a travel destination to the client.

Figure 2:
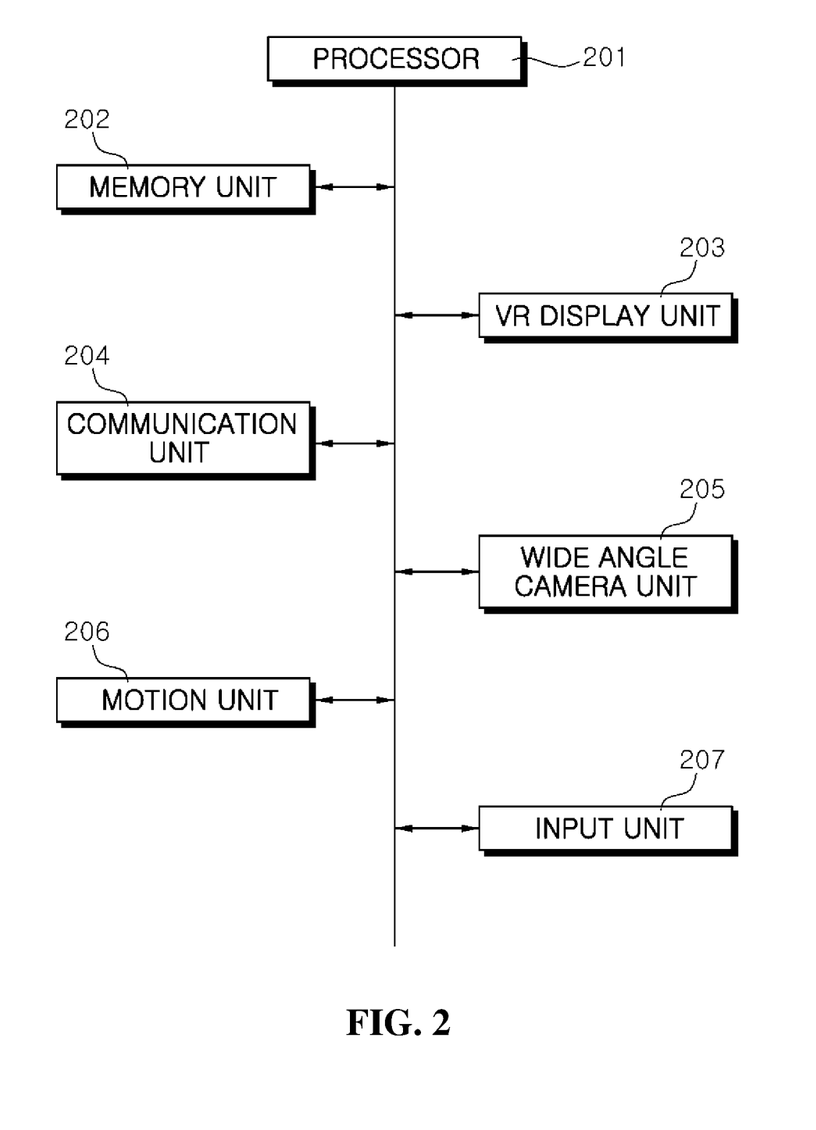
FIG. 2 is a block diagram showing an example of a real time VR service system according to an embodiment of the present invention.

FIG. 2 is a block diagram showing an example of a real time VR service system according to an embodiment of the present invention.

Referring to FIG. 2, the real time VR service system may include the client device 101, the avatar device 102, and the application management server 103. The application management server 103 may correspond to a device/server that manages/oversees/operates the entire real-time VR service system and may communicate with the client device 101 and the avatar device 102 to control the same. The application management server 103, the client device 101, and the avatar device 102 may include at least one component/unit for performing various functions/methods described in the specification.

For example, the application management server 103/the client device 101/the avatar device 102 may include a processor 201, a memory unit 202, a VR display unit 203, a communication unit 204, and/or a wide angle camera unit 205. Hereinafter, each component/unit will be described, and the following description may be commonly applied to the application management server 103, the client device 101, and the avatar device 102.

The processor 201 may implement the function, the process, and/or the method proposed in the specification, and may communicate with at least one another unit/component included in each device. Thus, the processor 201 may be described as being identical to each device.

The memory unit 202 may store various information/data/programs/applications/videos/images. The memory unit 202 may transmit the stored information/data/video/image to the processor 202 or may receive the same from the processor 201. The program/application stored in the memory unit 202 may be executed/performed by the processor 202. In particular, the memory unit 202 according to the present invention may store an application designed to implement the real time VR service system, and the corresponding application may be executed by the processor 201. The memory unit 202 may be inside or outside the processor 201.

The VR display unit 203 may output/display an image/video/screen. For example, the VR display unit 203 may correspond to a head mounted display (HMD). The VR display unit 203 may include at least one touch/pressure/proximity/motion/camera sensor to sense touch input of a user, and when the VR display unit 203 is an HMD, the HMD may include at least one direction/gyro/angle/acceleration sensor to sense a head/gaze direction/angle of the user as user input. When a user's gaze is tracked/sensed, eye tracking technology for allowing only the user to see clearly and blurring the reset may be used due to the weakness of a current 5G (5th Generation) network, and it may also be possible to track/sense a gaze using raw data in a general 4G long-term evolution (LTE)

The VR display unit 203 may transmit the sensing result to the processor. In particular, the VR display unit 203 in the specification may display various VR images/videos/screens received in real time through the communication unit 204 in real time.

The communication unit 204 may be connected to the processor 201 and may transmit and/or receive a wireless/wired signal to and from an internal/external device/server.

The wide angle camera unit 205 may input/acquire/recognize/sense an image/video/screen using at least one (wide angle) camera sensor (e.g., a 360-degree camera (sensor)). In particular, the wide angle camera unit 205 according to the present invention may capture/acquire/recognize/sense a wide angle image/video/screen in real time and may transmit the captured/acquired/sensed image as a VR image to the client device 101 through the communication unit 204 in real time. However, the wide angle camera unit in the specification is not limited to the 360-degree camera exemplified above and may mean/include a camera unit with a shooting angle less than 360 degrees. Thus, an ordinary person who does not own a 360-degree camera may be an avatar, and in this case, an image provided to the client device may be a general 2D image.

A motion unit 206 may include at least one motor/engine to control a motion (e.g., a movement/motion/flight direction/angle, etc.) of the avatar device 102 of a robot. The motion unit 206 may control movement of the avatar device 102 of the robot based on the control signal received from the processor 201 and/or the communication unit 204, and the received control signal may be a control signal transmitted from the client device 101 and/or the application management server 103.

An input unit 207 may include at least one sensor/module to sense various inputs of a user (in particular, a client) and may transfer the sensed input to the processor 201. For example, the input unit 207 may include a proximity sensor, a touch sensor, a pressure sensor, a camera sensor, a motion sensor, an infrared sensor, a microphone sensor, a gyro sensor, and/or a stick module (a module for detecting stick movement in up/down/left/right directions). An embodiment of controlling of a robot avatar device using a stick module will be described below with reference to FIG. 6.

Figure 3:
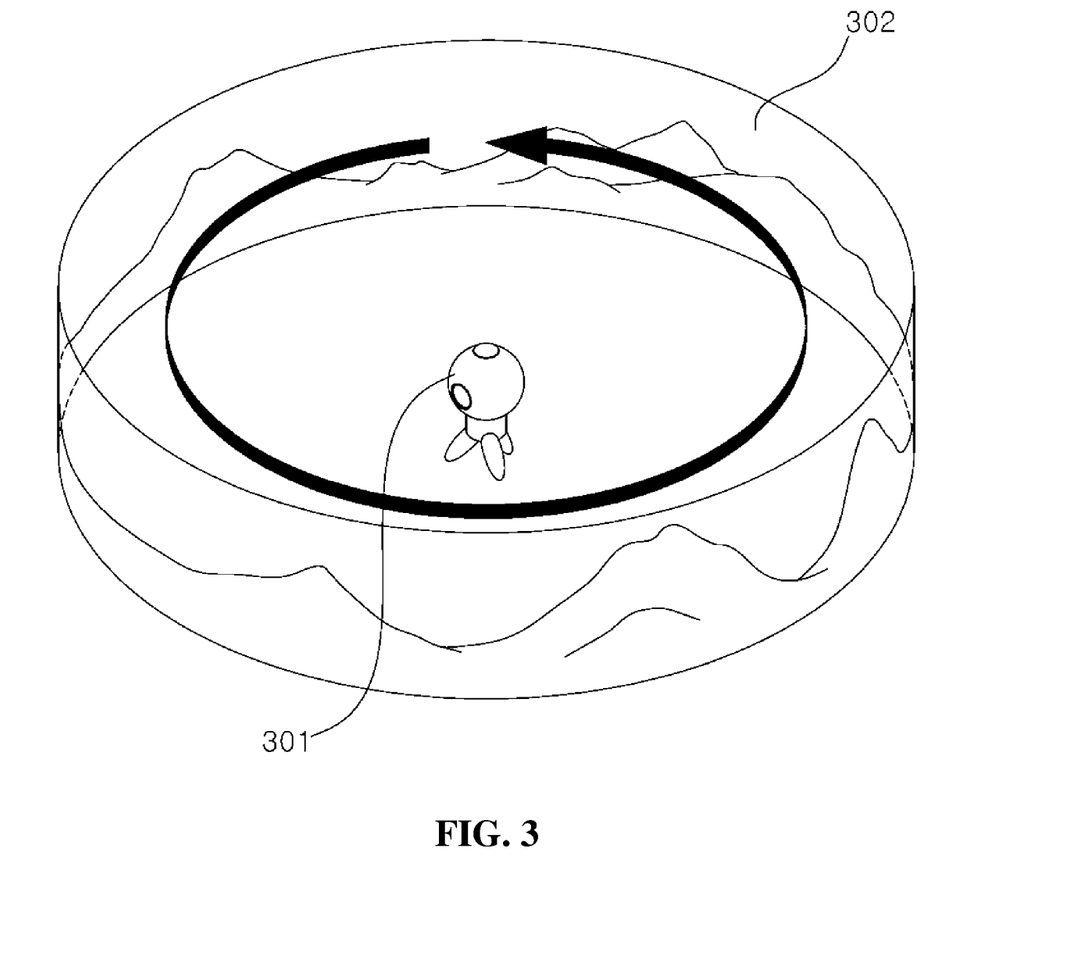
FIGS. 3 and 4 are diagrams showing an example in which a real time VR service system is implemented according to an embodiment of the present invention.
Figure 4:
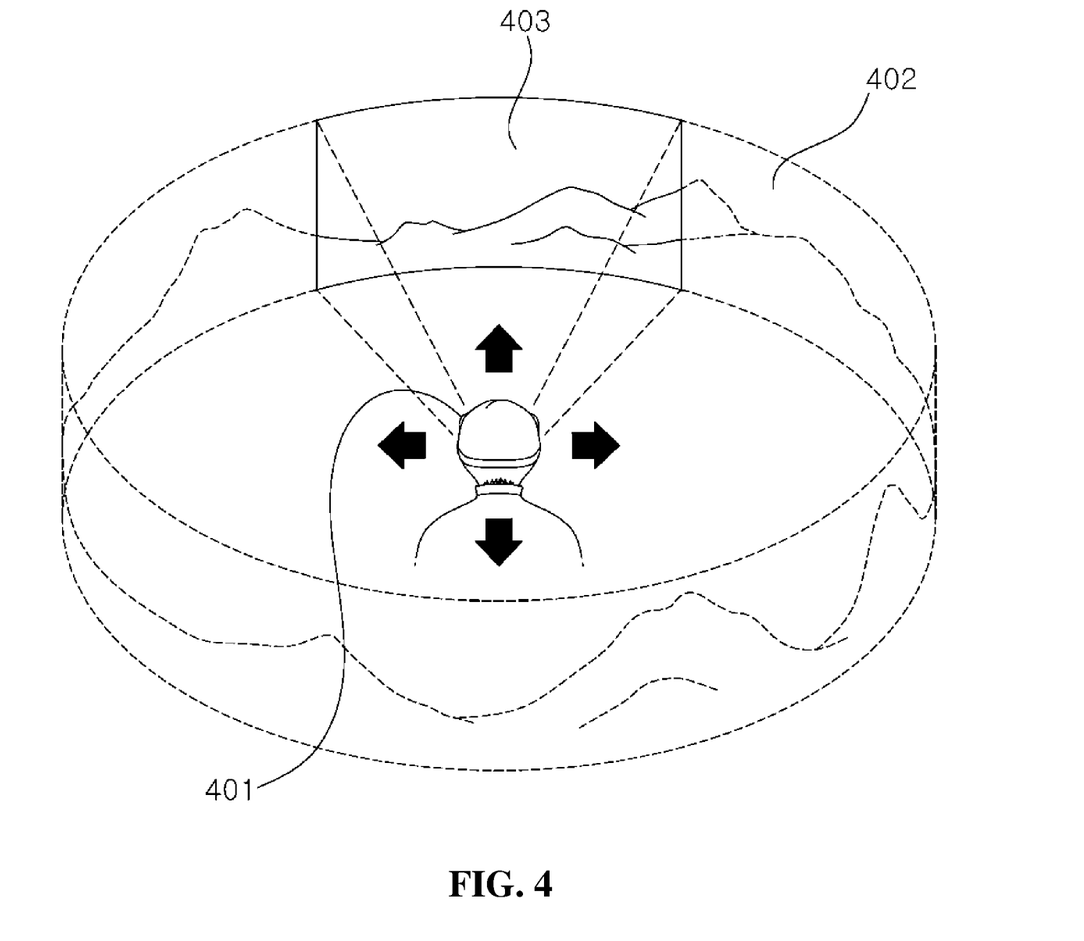

FIGS. 3 and 4 are diagrams showing an example in which a real time VR service system is implemented according to an embodiment of the present invention. In more detail, FIG. 3 is a diagram showing an example of an avatar device for providing a real time VR service, and FIG. 4 is a diagram showing an example of a client device for receiving a real time VR service.

Referring to FIG. 3, an avatar device 301 that is matched as shown in FIG. 1 may photograph a place requested by a client device through a wide angle camera unit and may transmit the same to the client device. In this case, the avatar device 301 may transmit the captured VR image 302 in real time at the promised time with the client device or may store the VR image 302 and may transmit the same later at the promised time.

The avatar device 301 may be moved to specific place and/or at a specific time requested by a client by a worker hired or employed for the real time VR service system (in particular, the avatar device) or may be implemented by an automatically moved robot device and may be moved directly to a specific place at an appointment time. In the latter case, the avatar device 301 may further include a moving/flying unit equipped with at least one engine/motor for moving in addition to the component/unit shown in FIG. 2.

Referring to FIG. 4, a client device 401 may receive an image captured by the wide angle camera unit of the avatar device 301 as a VR image similarly to FIG. 3. When receiving a 360-degree image 402, the client may adjust angle/direction (an angle/direction of the head wearing an HMD when a VR display unit is the HMD) of the client device 401 or a gaze angle/direction/position of the client to directly experience of a VR image 403 of a wanted angle/direction.

The client device 401 may search for information on a specific recognized object of the displayed VR image 403 and may provide the information to the client. For example, the client device 401 may automatically search for a recognized specific image/text of the displayed VR image 403 (for example, using an image/text search function provided by an application or a portal site) and may provide the search result to the client.

In this case, the client may communicate with an avatar or the avatar device 301 in real time while experiencing a VR image provided by the avatar device 301. For example, when a worker captures and provides the VR image in real time through the avatar device 301, the application management server may provide a voice/text chat function through an application and may provide a real time communication function between the avatar and the client.

As such, the client may actively request an environment the client wants to experience from an avatar (for example, please enter the store in front of you. Climb the mountain. Get closer to the artwork in front, etc.), and the avatar may actively accommodate the client's request and may create the environment that the client wants to experience. Through the communication function, the client may increase satisfaction by actively creating an environment the client wants to experience.

The avatar may directly explain feeling/impression of a site that the avatar currently experiences through a communication function, and may also provide additional information about a site knowledge/background/news, etc. to the client.

When a language used between the client and the avatar is different, the application management server may also provide an automatic translation function. In this case, the application management server may provide an automatic translation function to the both sides in real time through an automatic translation application pre-stored in a memory unit or real time Internet search.

Matching/connection between the client device 401 and the avatar device 301 may be based on 1:1 matching but 1:N or N:1 matching/connection may also be possible in some embodiments. As described above, matching/connection may be performed by the application management server based on the profiles registered by the client/avatar devices 401 and 301.

After receiving the VR image, the client may evaluate the avatar that provided the VR image. For example, the client may give an evaluation score for the corresponding avatar through an application, which may be stored and managed by the application management server. In some embodiments, the application management server may provide a function to recommend the avatar device 301 with a high matching possibility with the client device through the application. In this case, an average evaluation score for the recommended the avatar device 301 may also be provided, and as a score is increased, a recommended frequency may be increased.

Thus far, the real time VR service system for performing a method for performing matching/connection between the client device 401 and the avatar device 301 based on a registered profile has been described. However, the real time VR service system in the specification may also provide a real time matching/connection method based on the position of the avatar device 301, which will be described below with reference to FIG. 5.

Figure 5:
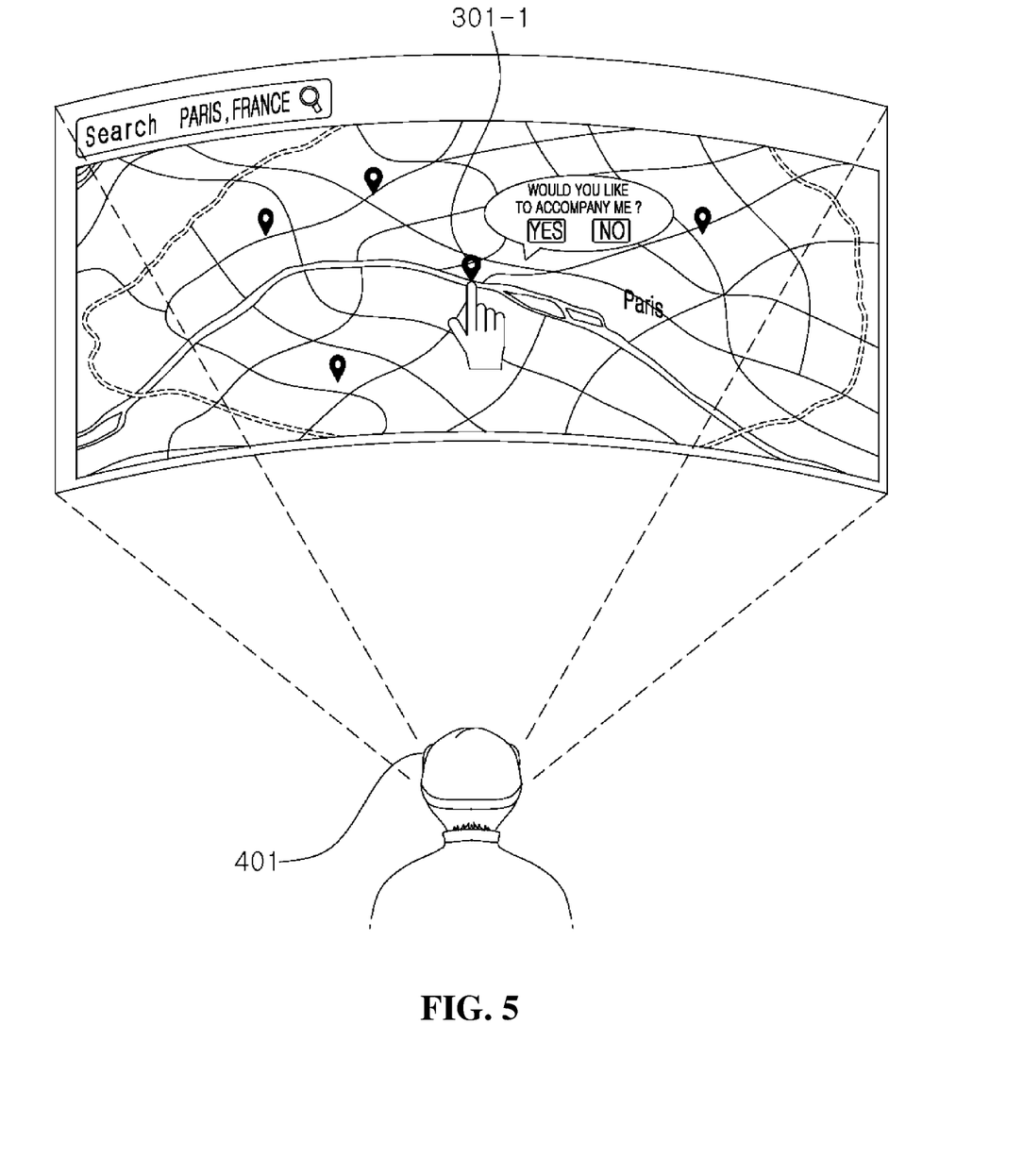
FIG. 5 is a diagram showing an example of a system for providing a VR image in real time based on a position according to an embodiment of the present invention.

FIG. 5 is a diagram showing an example of a system for providing a VR image in real time based on a position according to an embodiment of the present invention.

Referring to FIG. 5, the client device 401 may directly search in real time for a place the client device 401 wants to experience/experience. In this case, the application management server may provide the client device with information about at least one avatar device that currently provides/transmits/broadcasts a VR image in real time in a corresponding area. For example, when the client searches for Paris, France, the application management server may display the locations of avatar devices that currently transmit/broadcast/provide a VR image in Paris, France on a map, as shown in FIG. 5.

In this case, the application management server may also provide brief information (e.g., profile summary information, an average evaluation score, etc.) on each avatar device to the client device 401.

In this case, the searched avatar device may correspond to an avatar device that has previously agreed to share its own location information and VR service among avatar devices located in the place searched by the client device 401. The avatar device may be an electronic device carried by a worker, a tourist, and a tour guide or may correspond to a CCTV located in a specific area or a black box/CCTV and/or a drone installed in public transportation.

The client may select an avatar device 301-1 to request an experience based on information provided for each avatar device, and in this case, matching/connection with the selected avatar device 301-1 may be completed. For example, as shown in FIG. 5, the client may select any one of the avatar devices displayed on the map of Paris, France, and a guide phrase "Would you like to accompany me?" may be displayed.

When the client wants to request an experience through the avatar device 301-1, the client may touch a 'YES' button in the displayed guide, and as a result, matching/connection with the avatar device 301-1 may be completed.

The avatar device 301-1, which has been matched in this way, may transmit/provide the VR image currently being filmed to the client device 401 in real time.

Also in the embodiment, as in the aforementioned embodiment, various additional functions (the aforementioned communication function, automatic translation function, etc.) may be provided while providing the VR image, needless to say.

Figure 6:
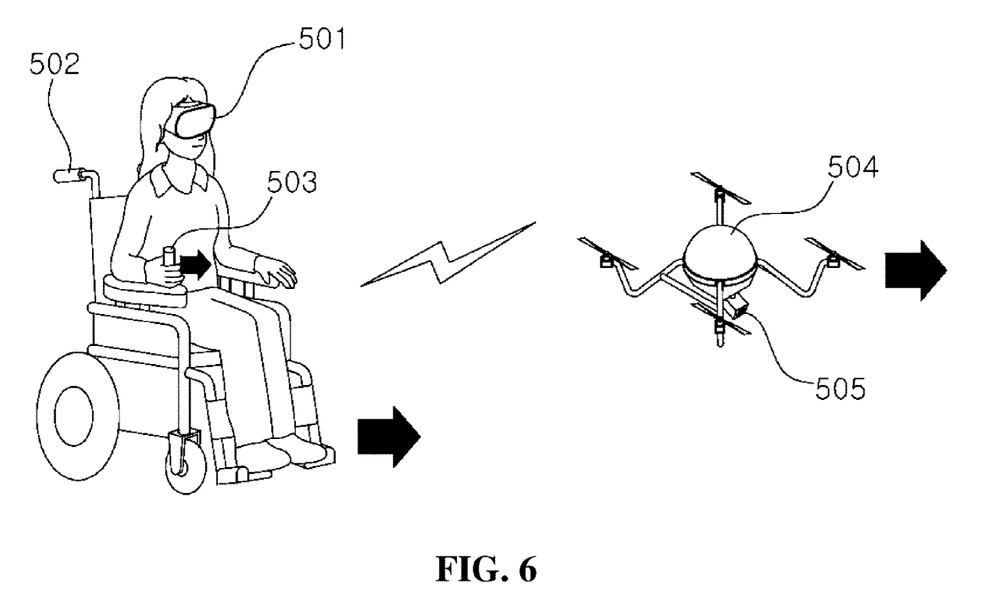
FIG. 6 is a diagram showing an example of a method of controlling an avatar device of a client device according to an embodiment of the present invention.

FIG. 6 is a diagram showing an example of a method of controlling an avatar device of a client device according to an embodiment of the present invention. In the present embodiment, the client device may correspond to an HMD device worn by the client, and the avatar device may correspond to a drone device, but the embodiment is not limited thereto.

Referring to FIG. 6, the client may apply input for controlling movement of an avatar device 504, which is a robot avatar device, to a client device 501. For example, the client may apply touch input for movement control of the avatar device 504 through the input unit provided in the client device 501, and the client device 501 for sensing the touch input may generate a control signal corresponding to the sensed input.

In this case, the client device 501 may provide an icon/image/user interface (UI) (e.g., a joystick or an arrow icon/image/UI in 4 directions, etc.) for control of the avatar device 504 through an application to facilitate the input of the client, and the client may perform drag input, etc. in a direction in which the avatar device 504 wants to move with respect to the icon/image/UI.

The control signal generated through the input may be transmitted to the avatar device 504 and may control moving/movement/flight/motion of the avatar device 504. The control signal may be directly transmitted to the avatar device 504 from the client device 501 or may also be transferred to the avatar device 504 through the application management server.

The aforementioned embodiment may be an embodiment in which the client controls the avatar device 504 through the client device 501, and an embodiment in which the client controls the avatar device 504 through another device to which the client device 501 is paired/connected may be derived. Hereinafter, it may be assumed that the client device 501 is previously paired/connected to another device 502, and here, the other device 502 may be assumed to be an electric wheelchair, but the embodiments are not limited thereto.

According to an embodiment, the client device 501 may be in a state of being previously paired/connected to the other device 502 through wireless/wired communication. Here, the other device 502 may include at least one component/unit described above in FIG. 2 to perform the function/operation described in the specification. In this case, when the other device 502 connected to the client device 501 is a mobile device that includes a motor/engine, etc. and is moved under control of the client (e.g., an electric wheelchair, a vehicle, a motorcycle, a bike, etc.), a control signal for control of movement/moving of the avatar device 504 may be generated in response to/in synchronization with a moving state of the other device 502. For example, when the other device 502 is an electric wheelchair, the control signal may be generated in response to a moving direction/speed (or a moving input signal input through a control stick 503 for a user to control movement of the electric wheelchair) of the electric wheelchair, and the generated control signal may be transmitted to the avatar device 504. The control signal may also be transmitted directly to the avatar device 504 from the client device 501 or may also be transferred to the avatar device 504 through the application management server. As in the embodiment, moving/movement of the other device 502 and moving/movement of the avatar device 504 may be synchronized with each other, and thus a higher sense of presence may be provided to the client, and the client may actively create his or her experience/experience environment.

When a wide angle camera unit 505 included in the avatar device 504 provides a shooting angle less than 360 degrees, a control signal controlling the shooting angle of the wide angle camera unit 505 may also be transmitted from the client device 501. In this case, the transmitted control signal may be generated in response to a gaze/head direction/angle/speed/acceleration of the client, sensed by the client device 501, and movement of the wide angle camera unit 505, such as a shooting direction/angle/speed/acceleration, may be controlled according to the corresponding control signal. As such, the client may actively experience an angle/direction the client wants. When the moving/movement/flight/motion of the avatar device 504 is controlled by another device paired/connected to the client device 501 as in the aforementioned embodiment, the moving/movement/flight/motion of the avatar device 504 may be controlled by a first control signal generated by the other device 502, and a shooting angle/speed/direction of the wide angle camera unit 505 of the avatar device 504 may be independently controlled by a second control signal generated by the client device 501.

In this case, as in the aforementioned embodiment, a customized experience service for allowing the avatar device to look like a client may be provided by displaying a face/avatar/emoticon of the client on a (VR) display unit of the avatar device during flight.

Hereinafter, various additional functions provided by a real time VR service system (in particular, an application management server) will be listed in addition to the aforementioned embodiments. At least one of the listed functions may be mainly provided by the application management server and each function may be performed by the client device and/or the avatar device:

1. Login function
   Individual login function and member registration function
   Easy login via existing email
2. Personal page provision function
   Profile activation function through personal page setting
   The present service may be executed after general consent such as personal information consent
   Registration function of personal profile, residence information sheet, and interests
3. Avatar setting function
   Personal avatar settings and customization function
   Avatar display function set in profile
4. Topic setting function
   Function to set and register topic of interest among various categories
5. Topic search function
   Search function to find topics of interest in sub-categories
6. Experience fee payment function
   Proceed after watching first 15 seconds of ad
   Intermediate pop-up advertisement function or AR advertisement processing function
   Personal Payment System function
   Point payment function (e.g., the client device/account pays the reserve, and when the experience is performed, the reserve is deducted as much as the proxy cost, and the deducted cost is credited to the avatar device/account)
   Mileage accumulation method for each account according to frequency/frequency of use
   Card/cash payment function
7. Storage function
   Personal image storage function using application management server and simultaneous or individual storage function for client device and avatar device
   Function of additionally producing processed content using stored image by storing image in cloud and setting the image to be downloaded for predetermined time period to solve server problem
   It is possible to concurrently perform video storage and individual storage functions using an integrated cloud
8. Wide angle camera function (in particular, in the case of avatar device)
   VR camera link function through various wearable devices (e.g., a smart watch, a link flow neck type smart wearable device, etc.)
   It is possible to expand a camera extension range by linking various cameras
9. Image mode VR
   It is possible to select VR general mode and goggles wearing mode 10. Image mode general General 2D video call function 11. Location service function This function allows the client device to check the location of the avatar device that has agreed to location disclosure. The client device searches for an avatar device close to a place that the client device wants and matches the avatar device with the client device.

12. Recommendation function

This function reminds each device of major schedules or travel plans of avatar/client device.

13. Direct message/comment conversation function

Conversation function through note/comment between client device and avatar device 14. Photo/video upload function in personal page Function for allowing client to show PR or interests by posting individual photos on personal page 15. Matching function between to do and wanted thing Matching is performed between a wanted thing in a profile of a client device and a thing to do in a profile of an avatar device, and thus other users are capable of seeing the matching and are capable of performing detailed search.

16. Function of organizing interests

Interest setting function, such as travel, medical, welfare, automobile, etc. When recommending an avatar device to a client device, it is possible to link a priority or an automatic recommendation system.

The largest difference with the aforementioned real-time VR service system is that the existing travel and exploration programs using a VR use a recorded image but the present service only transmits a VR image in real time. In order to make a recorded video, it takes a lot of time to go through pre-shooting and editing, and there are disadvantages in that timeliness is low in that videos from the past are played and the experientiality of experiencing a scene directly is low. VR contents using other graphics have a long production period and are expensive to create. However, the present service may allow the client to see images the client wants in real time to feel a real-time sense of presence, and shooting, editing, and expensive graphic production costs may not be incurred, and accordingly, the largest advantage may be that it is possible to perform an operation at a low cost in terms of services.

Embodiments of the present invention may be implemented by various devices, for example, hardware, firmware, software, or a combination thereof. In the case of implementation by hardware, an embodiment of the present invention may be implemented by one or more of an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, etc.

In addition, in the case of implementation by firmware or software, an embodiment of the present invention may be implemented in the form of a module, a procedure, or a function that performs the aforementioned functions or operations and may be stored in a recording medium readable through various computer devices. Here, the recording medium may include a program instruction, a data file, and a data structure alone or in combination. A program instruction recorded on the recording medium may be specially designed and configured for the present invention or may be known and available to those skilled in the art of computer software. For example, the recording medium may include magnetic media such as a hard disk, a floppy disk, and a magnetic tape, optical media such as a compact disk read only memory (CD-ROM), and a digital video disk (DVD), magneto-optical media such as a floptical disk, and a hardware device especially configured to store and execute a program command, such as ROM, RAM, and a flash memory.

Although the embodiments of the present invention have been described above, it is understood that those of ordinary skill in the art to which the present invention pertains may make various modifications without departing from the scope of the claims of the present invention.

INDUSTRIAL APPLICABILITY

According to the present invention, a client may indirectly experience various environments such as scenery, objects, and exhibits in a specific area (especially, far away) that the client wants to experience through a virtual reality (VR) image in a more realistic way even if the client does not go directly, and it may be possible to communicate with an avatar in real time, and thus the client may more actively and flexibly experience desired experience through the avatar.

According to the present invention, it may be possible to derive a new VR services that did not exist before, such as VR travel/experience, and thus the client may more actively and flexibly obtain experience wanted by the client.

The invention claimed is:

1. A real time virtual reality (VR) service provision method comprising:

registering a client profile in an application management server by a client device, the client profile including information on a VR image that the client device wants to request, by the client device;

registering avatar profiles in the application management server by a plurality of avatar devices, the avatar profiles including information on a VR image to be requested by the avatar device;

comparing the client profile and the avatar profiles with each other to search for an avatar profile, at least one piece of information of which is matched with the client profile, and providing a first searching result to the client device, by the application management server;

receiving input of the client device, for selecting a specific avatar device in the first search result, by the application management server;

matching the client device and the specific client device with each other by the application management server; and receiving a VR image from the matched avatar device by the client device, wherein, as the information on the VR image, the client profile includes information on a shooting location, a shooting time, a language used, and/or a shooting request cost of the VR image the client device wants to request, and the avatar profile includes information on a shooting location, a shooting time, the language used, and/or a shooting request cost of the VR image to be requested, wherein the receiving the VR image further includes:

providing a real time voice chat or text chat function between the client device and the matched avatar device by the application management server, and wherein the providing the real time voice chat or text chat function includes:

when the used language registered in the client profile by the client device and the used language registered in the avatar profile by the matched avatar device are different from each other, performing automatic translation according to the language used by each device and providing the real time voice chat or text chat function by the application management server.

2. The real time VR service provision method according to claim 1, wherein the receiving the VR image from the matched avatar device by the client device includes:
receiving the VR image captured at the shooting time and the shooting location, which are registered in the client profile, from the matched avatar device by the client device.

3. The real time VR service provision method according to claim 1, wherein the providing the first searching result to the client device includes:
when the first searching result includes a plurality of avatar devices, ranking an avatar device with a higher matching degree of profile information with the client device at a higher level among the plurality of avatar devices and providing the avatar device to the client, by the application management server.

4. The real time VR service provision method according to claim 1, further comprising:
searching for a shooting location of a VR image that the client device currently wants to request; and
providing a second searching result obtained by searching for an avatar device positioned at the shooting location to the client device,
wherein the second searching result includes information on at least one avatar device positioned within a preset distance from the shooting location, information on a current location of the at least one avatar device, and/or information on an avatar profile of the at least one avatar device.

5. The real time VR service provision method according to claim 4, further comprising:
when the second searching result includes a plurality of avatar devices, receiving selection input for selecting a specific avatar device among the plurality of avatar devices from the client device and matching the selected specific avatar device and the client device, by the application management server; and
receiving a VR image from the matched avatar device by the client device.

6. The real time VR service provision method according to claim 1, further comprising:
when the matched avatar device is a robot avatar device, transmitting a first control signal for controlling a moving direction, angle, and/or speed of the matched avatar device to the matched avatar device, by the client device; and
moving the matched avatar device according to the first control signal,
wherein the first control signal is generated in synchronization with a moving input signal of a user with respect to the client device.

7. A real time virtual reality (VR) service provision method comprising:
registering a client profile in an application management server by a client device, the client profile including information on a VR image that the client device wants to request, by the client device;
registering avatar profiles in the application management server by a plurality of avatar devices, the avatar profiles including information on a VR image to be requested by the avatar device;
comparing the client profile and the avatar profiles with each other to search for an avatar profile, at least one piece of information of which is matched with the client profile, and providing a first searching result to the client device, by the application management server;
receiving input of the client device, for selecting a specific avatar device in the first search result, by the application management server;
matching the client device and the specific client device with each other by the application management server;
receiving a VR image from the matched avatar device by the client device;
when the matched avatar device is a robot avatar device, transmitting a first control signal for controlling a moving direction, angle, and/or speed of the matched avatar device to the matched avatar device, by the client device; and
moving the matched avatar device according to the first control signal,
wherein the first control signal is generated in synchronization with a moving input signal of a user with respect to the client device, and
wherein, when the client device is paired with another device controlled to be moved by a user, the first control signal is generated in synchronization with a moving control signal received by the client device from the other device, and moving of the matched avatar device is synchronized with moving of the other device.

8. A real time virtual reality (VR) service provision method comprising:
registering a client profile in an application management server by a client device, the client profile including information on a VR image that the client device wants to request, by the client device;
registering avatar profiles in the application management server by a plurality of avatar devices, the avatar profiles including information on a VR image to be requested by the avatar device:
comparing the client profile and the avatar profiles with each other to search for an avatar profile, at least one piece of information of which is matched with the client profile, and providing a first searching result to the client device, by the application management server;
receiving input of the client device, for selecting a specific avatar device in the first search result, by the application management server;
matching the client device and the specific client device with each other by the application management server;
receiving a VR image from the matched avatar device by the client device;
when the matched avatar device is a robot avatar device, transmitting a first control signal for controlling a moving direction, angle, and/or speed of the matched avatar device to the matched avatar device, by the client device; and
moving the matched avatar device according to the first control signal,
wherein the first control signal is generated in synchronization with a moving input signal of a user with respect to the client device,
wherein, when a maximum shooting angle of a camera unit included in the matched avatar device for capturing the VR image is less than 360 degrees, a shooting direction of the camera unit is synchronized with a user head wearing the client device or a gaze direction, wherein a shooting angle of the camera unit is controlled according to a second control signal transmitted from the client device, and wherein the second signal is generated in synchronization with a sensing result of the user head wearing the client device or the gaze direction.

\* \* \* \* \*